(12) United States Patent
Jin et al.

(10) Patent No.: US 11,561,917 B2
(45) Date of Patent: Jan. 24, 2023

(54) USB CONNECTION MANAGEMENT

(71) Applicant: Hewlett Packard Enterprise Development LP, Houston, TX (US)

(72) Inventors: Jiabao Jin, Beijing (CN); Yafeng Jiang, Beijing (CN); Jian Dong, Santa Clara, CA (US); Chunfeng Wang, Beijing (CN); Berend Dunsbergen, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/029,640

(22) Filed: Sep. 23, 2020

(65) Prior Publication Data

US 2022/0092011 A1     Mar. 24, 2022

(51) Int. Cl.
    *G06F 13/20*     (2006.01)
    *G06F 13/40*     (2006.01)
    *G06F 13/42*     (2006.01)

(52) U.S. Cl.
    CPC ...... *G06F 13/4004* (2013.01); *G06F 13/4282* (2013.01)

(58) Field of Classification Search
    CPC .................................................. G06F 13/4004
    See application file for complete search history.

(56) References Cited

U.S. PATENT DOCUMENTS

| 7,877,788 | B1* | 1/2011 | Topp | G06F 21/85 726/4 |
| 9,251,334 | B1* | 2/2016 | Molitor | G06F 21/10 |
| 2002/0161596 | A1* | 10/2002 | Johnson | G06Q 10/10 705/1.1 |
| 2006/0064588 | A1* | 3/2006 | Tidwell | H04L 41/5067 713/169 |

(Continued)

FOREIGN PATENT DOCUMENTS

CN     111027046 A    *   4/2020

OTHER PUBLICATIONS

Google, Translation of CN111027046A, Apr. 2020, p. 1-6 (Year: 2020).*

*Primary Examiner* — Henry Tsai
*Assistant Examiner* — Dean Phan
(74) *Attorney, Agent, or Firm* — Hewlett Packard Enterprise Patent Department

(57) ABSTRACT

In embodiments of the present disclosure, there is provided a solution for managing a USB connection between a USB device and a host device. According to embodiments of the present disclosure, a USB management server receives, from a USB management client at a host device, USB ID information for identifying a USB device that is plugged into the host device. Whether the USB ID information is valid is determined based on an authentication policy for authenticating the USB device. If the USB ID information is valid, the USB management client is instructed to permit a connection between the USB device and the host device.

(Continued)

Accordingly, the connection may be managed by the USB management server. Embodiments of the present disclosure present an effective way for managing USB connections in a centralized way, which provides various flexible authentication policies and requires less manual operations.

14 Claims, 9 Drawing Sheets

(56) References Cited

U.S. PATENT DOCUMENTS

| | | | |
|---|---|---|---|
| 2006/0218320 A1* | 9/2006 | Avraham | G06F 21/554 710/62 |
| 2007/0061566 A1* | 3/2007 | Bailey | H04L 9/0897 713/151 |
| 2009/0122798 A1* | 5/2009 | Iwai | H04L 61/6004 370/392 |
| 2009/0327696 A1* | 12/2009 | Hatlelid | H04L 9/3265 713/151 |
| 2012/0204239 A1* | 8/2012 | Suginaka | G06F 21/34 726/4 |
| 2012/0254955 A1* | 10/2012 | Suginaka | G06F 21/34 726/4 |
| 2013/0014221 A1* | 1/2013 | Moore | G06F 21/85 726/3 |
| 2013/0117566 A1* | 5/2013 | Jang | G06F 21/34 713/168 |

* cited by examiner

USB CONNECTION MANAGEMENT

BACKGROUND

Nowadays, there are more and more types of USB devices. USB devices such as USB storage disks, USB cameras and the like may be plugged into host devices. These USB devices may establish USB connections with the host devices for communication. However, some host devices are not permitted to connect with external USB devices due to security reasons. Therefore, USB ports in these host devices should be disabled one by one, which leads to heavy manual labor and great time cost.

SUMMARY

According to a first aspect of the present disclosure, there is provided a method implemented at a USB management server. In the method, USB ID information for identifying a USB device that is plugged into the host device is received from a USB management client at a host device. Whether the USB 1D information is valid is determined based on an authentication policy for authenticating the USB device. The USB management client at the host device is instructed to permit a connection between the USB device and the host device in accordance with a determination that the USB ID information is valid. The USB management client at the host device is instructed to forbid the connection between the USB device and the host device in accordance with a determination that the USB ID information is invalid.

According to a second aspect of the present disclosure, there is provided a method implemented at a USB management client. In the method, in accordance with a determination that a USB device is plugged into a host device, USB ID information is obtained for identifying the USB device. The USB ID information is transmitted to a USB management server for authenticating the USB device. In response to an acknowledgement from the USB management server indicating that the USB ID information is valid based on an authentication policy, the host device is permitted to establish a connection with the USB device.

According to a third aspect of the present disclosure, there is provided a authentication device. The authentication device comprises: a processor; and a memory coupled to the processor, the memory storing instructions to cause the processor to implement a USB management server at the authentication device for authenticating a USB device by: receiving, from a USB management client at a host device, USB ID information for identifying a USB device that is plugged into the host device; obtaining an authentication policy for authenticating a connection between the USB device and the host device; and in accordance with a determination that the USB ID information is valid based on the authentication policy, instructing the USB management client at the host device to establish a connection with the USB device.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Usually, USB port(s) in a host device may be enabled or disabled via functions provided by an operation system installed on the host device. If the USB port is enabled, a user may plug a USB device (such as a USB storage disk and the like) into the host device so as to establish a connection between the USB device and the hose device.

Figure 1:
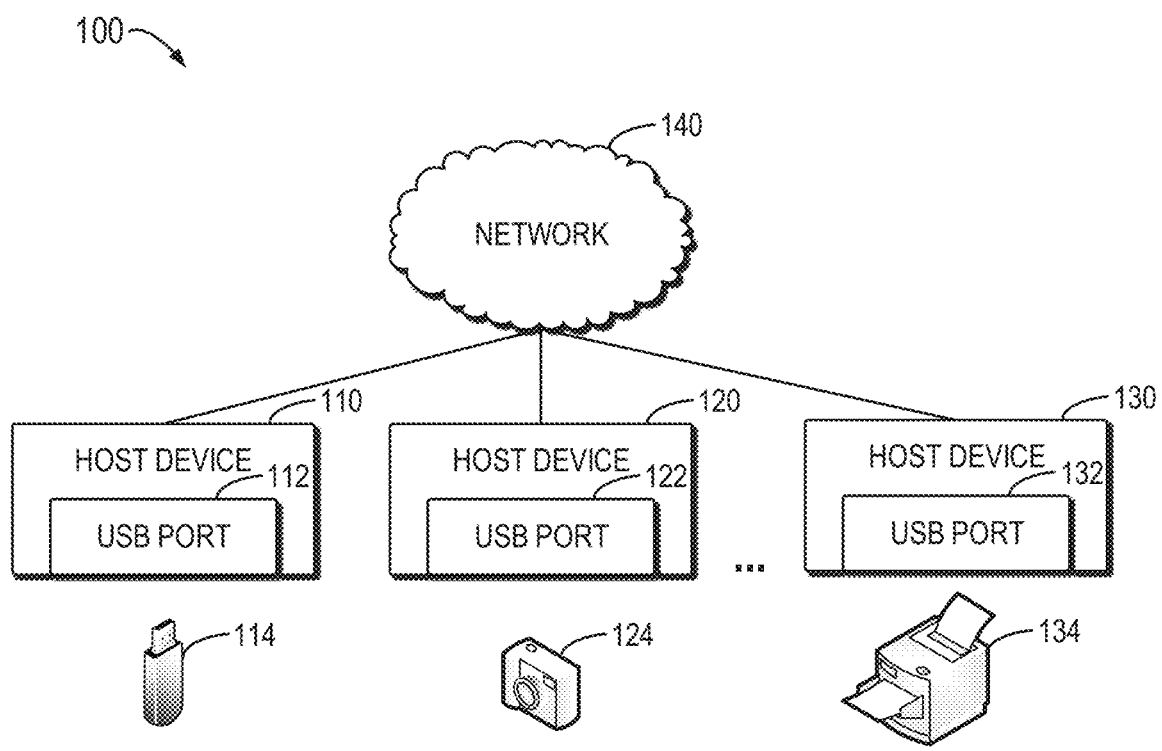
FIG. 1 illustrates an example environment in which embodiments of the present disclosure may be implemented.

Reference will be made to FIG. 1 for a working environment of the USB connection management. FIG. 1 illustrates an example environment 100 in which embodiments of the present disclosure may be implemented. For a purpose of description, the present disclosure will take a company that has multiple host devices and USB devices as an example environment. As illustrated in FIG. 1, multiple host devices 110, 120, . . . , and 130 in the company have one or more USB ports. For example, a host device 110 has a USB port 112, a host device 120 has a USB port 122, . . . , and a host device 130 has a USB port 132. These host devices 110, 120, . . . , and 130 are connected via a network 140. Multiple types of USB devices 114, 124, . . . , and 134 may be plugged into those host devices as external devices.

Traditionally, USB connection may be managed based on USB port control and USB certification. In one solution, when a USB device is plugged into an enabled USB port of a host device, the host device itself checks a USB certification stored in the USB device. If the USB certification is valid, then a connection may be established between the USB device and the host device. For safety reasons, an IT engineer of the company may disable USB ports in some host devices or deploy more advanced security policies via USB certifications. However, the IT engineer has to configure each of the UBS devices and the host devices. Considering there may be tens of or even more USB devices and host devices, the USB connection management is time-consuming and labor-intensive.

In view of the above drawbacks, embodiments of the present disclosure provide a more effective way for managing a USB connection between a USB device and a host device. Specifically, a client-server architecture is proposed for USB connection management, where a USB management client is provided at the host device, and a USB management server is provided for determining whether the USB device is permitted to establish a USB connection based on an authentication policy.

Figure 2:
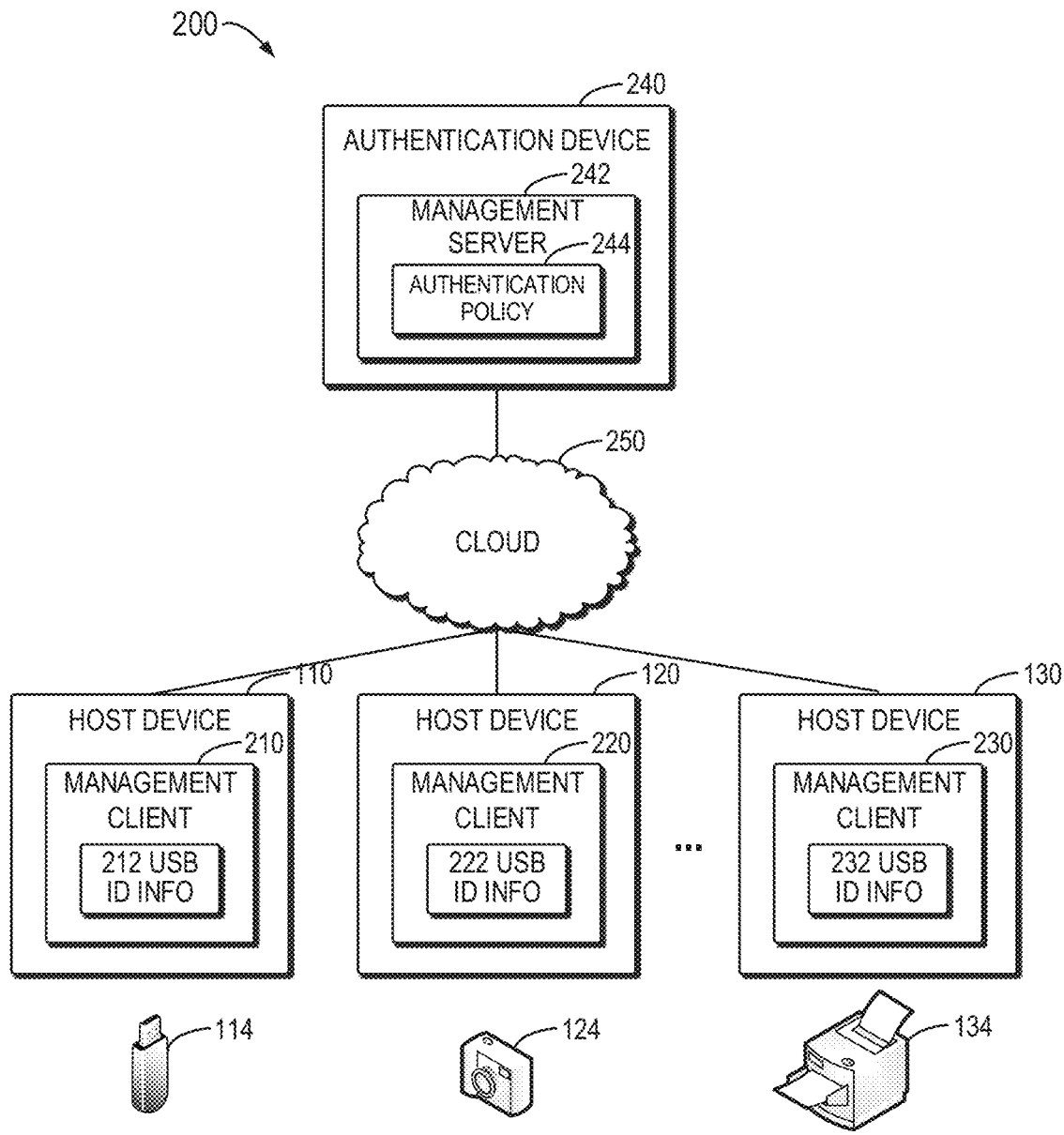
FIG. 2 illustrates a block diagram of an example architecture for managing a USB connection between a USB device and a host device according to embodiments of the present disclosure.

Hereinafter, reference will be made to FIG. 2 for a brief description of the present disclosure. FIG. 2 illustrates a block diagram 200 of an example architecture for managing a USB connection between a USB device and a host device according to embodiments of the present disclosure. In FIG. 2, a management client may be provided in each host device, and the management client may obtain USB ID information about the host device and a USB device that is plugged in. As illustrated, a management client 210, 220, . . . , and 230 may be provided in the host device 110, 120, . . . , and 130, respectively. The management client 210, 220, . . . , and 230 may obtain USB ID information 212, 222, . . . , and 232 about the host devices 110, 120, . . . , and 130 and the USB devices 114, 124, . . . , and 134, respectively.

A USB management server 242 is provided at an authentication device 240, and the USB management server 242 receives via a cloud 250 the USB ID information 212, 222, . . . , and 232, respectively. Here, the USB management server 242 determines a validity of the received USB ID information based on an authentication policy 244 and sends an instruction to the management client. If the USB ID information is valid, the USB device is allowed to establish a connection with the corresponding host device. Otherwise, the USB device is forbidden to establish a connection with the corresponding host device.

It is to be understood that the USB storage disk, the USB camera and the USB printer in FIG. 2 are just examples of USB devices for illustration. Alternatively and/or in addition to, the USB device may include another device such as a USB scanner and so on. Although the management server 242 is provided in the authentication device 240 and communicates with the management clients 110, 120, . . . and 130 via the cloud 250 so as to provide a centralized way for the USB management, the manager server 242 may also be provided locally in one of the host devices. Therefore, the manager server 242 may manage the host devices and USB devices in a localized way.

With the solution in FIG. 2, the USB devices and host devices may be managed in a centralized/localized way via the management server 242 at the authentication device 240. Compared with existing solutions for configuring each host device and distributing a certification to each authenticated USB device, embodiments of the present disclosure greatly reduce manual operations of the IT engineer. Meanwhile, the authentication policy 244 may provide more customizable security strategies, such that host devices and USB devices may be managed in a more effective and easy way.

Figure 3:
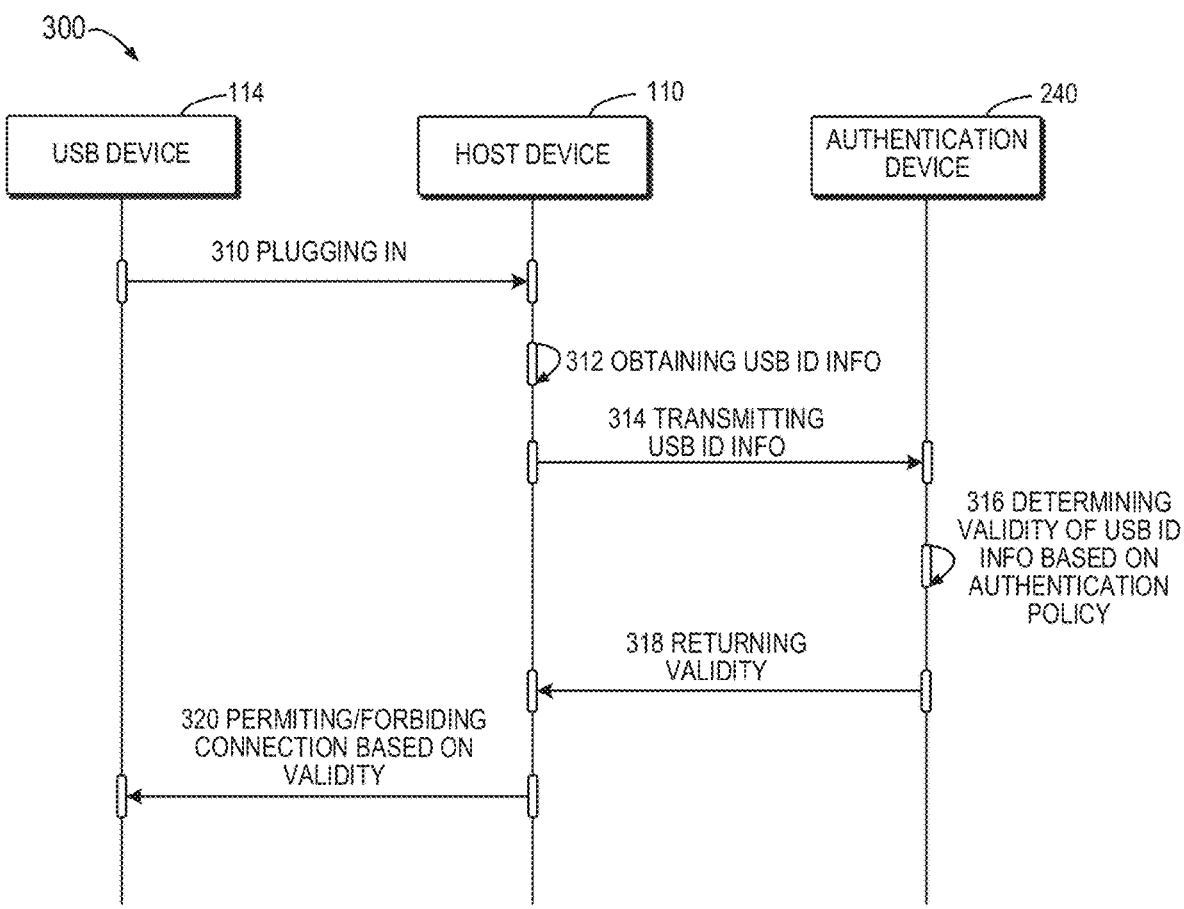
FIG. 3 illustrates a signaling chart of an example procedure for managing a USB connection between a USB device and a host device according to embodiments of the present disclosure.

Hereinafter, reference will be made to FIG. 3 for more details about the present disclosure. FIG. 3 illustrates a signaling chart 300 of an example procedure for managing a USB connection between a USB device and a host device according to embodiments of the present disclosure. It is to be understood that FIG. 3 shows only an example where the USB device 114 is plugged 310 into the host device 110. In other embodiments, another USB device may be plugged into another host device. For example, the USB device 124 may be plugged into the host device 120, . . . , and the USB device 134 may be plugged into the host device 130.

As illustrated in FIG. 3, the USB device 114 is plugged 310 into the host device 110. Upon a detection of the USB device 114, the management client 210 obtains 312 USB ID information associated with the USB device 114 and the host device 110. In the present disclosure, various types of USB ID information are allowed, and reference will be made to FIG. 4 for further description.

Figure 4:
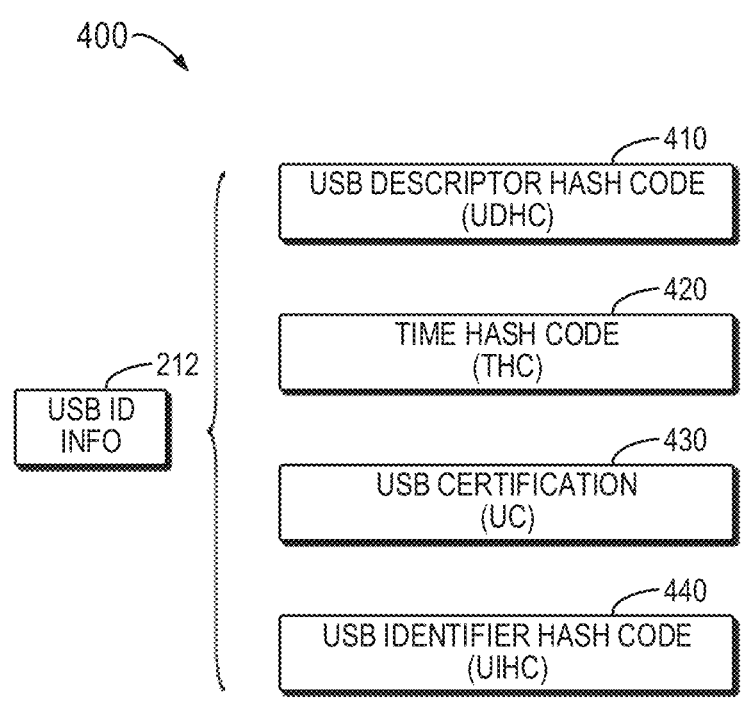
FIG. 4 illustrates a block diagram of example types of USB identification (ID) information according to embodiments of the present disclosure.

FIG. 4 illustrates a block diagram of example types of USB ID information according to embodiments of the present disclosure. In some embodiments, the USB ID information 212 may comprise any of: a USB descriptor hash code (UDHC) 410, a time hash code (THC) 420, a USB certification (UC) 430, and a USB identifier hash code (UIHC) 440.

In some embodiments, the management client 210 may generate the UDHC 410 based on an identification of the USB device 114 and an identification of the host device 110. For example, the USB ID information 212 may include a serial number or a MAC address of the host device 110, as well as a USB device descriptor such as vendor ID, product ID, model ID and the like. It is to be understood that the above paragraph just provides an example for illustration, the USB ID information 212 may have another data format. For example, the USB ID information 212 may include a MAC address of the host device 110 and a unique product ID of the USB device 114. In another example, identifications for the host device 110 and the USB device 114 may be placed in a different order. In still another example, the USB ID information 212 may be compressed and/or encrypted into a different format.

In some embodiments, the USB ID information 212 may comprise the THC 420, where the management client 210 may generate the unique time hash code based on an identification of the host device 110 and a time point at which the USB device 114 is plugged into the host device 110. Here, the identification of the host device 110 may be represented by a serial number or a MAC address and the like, and the time point may be represented by a timestamp. If the USB device 212 is plugged into the host device 110 at 18:00:00 on May 1, 2020, the timestamp may be represented by "18000005012020." If the host device 110 has more than one USB port, then the timestamp may be represented by a more accurate format. For example, the time point may be accurate in a resolution of millisecond in case that two or more USB devices are plugged into different USB ports of the same host device at the same time. In another example, the timestamp may be retrieved from an official time-stamping authority. In some embodiments, a hash code may be generated based on the timestamp and predefined hash algorithms. In this way, the hash code may be a unique code for identifying the USB plugin operation and then transmitted to the management server 242 for authentication.

In some embodiments, the USB ID information 212 may comprise the UC 430. Here, the USB certification 430 may be stored into the USB device 114 in advance according to the existing solution. At this point, the management client 210 just reads the USB certification 430 from the USB device 114. In some embodiments, the USB ID information 212 may comprise the UIHC 440 that is generated by the USB device 114. Here, the USB device 114 generates its own identifier in its firmware by default.

As illustrated in FIG. 4, the USB ID information 212 may comprise any of the above four types. With the above embodiments, the USB 1D information 212 may uniquely identify the USB device 114 and the host device 110 associated with the plugin operation, such that the management server 242 may determine whether the plugin operation meets the authentication policy 244.

Referring back to FIG. 3, once the USB ID information 212 is obtained, the host device 110 may transmit 314 it to the management server 242 via the management client 210. Alternatively, if the management server 242 is deployed at the host device 110, the host device 110 may implement the authentication by itself. Various modes are provided for authenticating the USB ID information 212. In an auto transmitting mode, the authentication policy 244 may be configured at the management server 242 at the very beginning, and then the host device 110 may accept or deny the USB device 114 based on feedback from the management server 242 after the USB ID information 212 is transmitted to server. In a manual mode, no authentication policy is defined and the IT engineer may click a button in the management server 242 to make the authentication operation after the USB ID information is transmitted to management server 242. With the embodiments, the authentication operation may be configured to a desired transmitting mode. Therefore, the management server 242 may provide an enhanced and customized solution for providing centralized/localized management.

In FIG. 3, the management client 210 in the host device 110 transmits the USB ID information 212 to the management server 242 in the authentication device 240. Specifically, after USB setup and an enumeration procedure on the host device 110, the host device 110 sends a message to indicate what kind of USB ID information is adopted. For the UDHC 410, no subsequent message is needed. For the THC 420, the management client 210 generates the THC 420 and sends it back to USB device 114 for storing in the USB device 114. Here, the USB device 114 may store its own THC, alternatively, the USB device 114 may not store the THC. For the UC 430, the USB ID information 212 is sent from the host device 110 to the authentication device 240 for an authentication action. For the UIHC 440, it is similar as the case of the UC 430. Additionally, the management server 242 may reset the UIHC 440 in the USB device 114 through the management client 210 in the host device 110. In the above transmitting procedure, the USB ID information may be transmitted directly; alternatively, the USB ID information may be transmitted in an encrypted manner.

Figure 5:
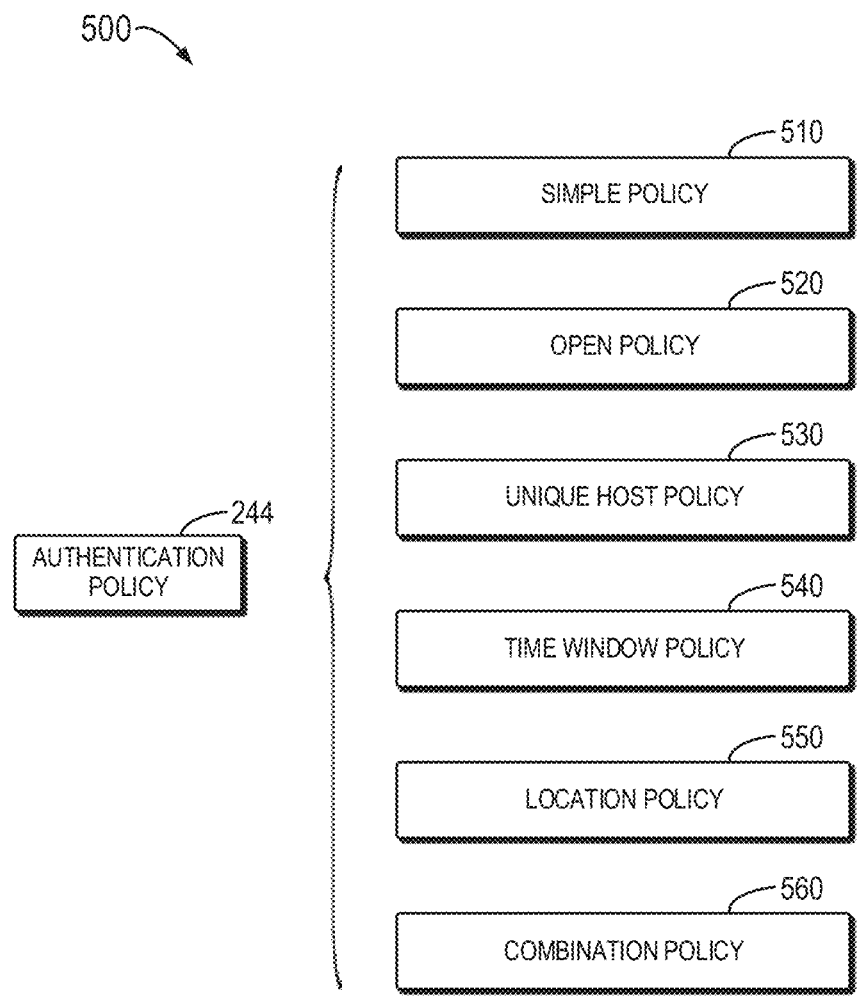
FIG. 5 illustrates a block diagram of example types of an authentication policy according to embodiments of the present disclosure.

Further, the authentication device 240 determines 316 a validity of the USB ID information 212 according to the authentication policy 244. In the present disclosure, the authentication policy 244 may comprise multiple types, where FIG. 5 illustrates a block diagram 500 of example types of an authentication policy according to embodiments of the present disclosure. As illustrated in FIG. 5, the authentication policy 244 may comprise any of: a simple policy 510, an open policy 520, a unique host policy 530, a time window policy 540, a location policy 550, and a combination policy 560.

In some embodiments, the authentication policy 244 may comprise the simple policy 510. Here, a list of authenticated identifications may be predefined at the management server 242. The predefined list may comprise any of the UDHC, THC, UC or UIHC. At this point, only USB ID information that matches the predefined identification is considered as valid. The simple policy 510 may accept both of the manual and auto transmitting modes.

Specifically, if the USB ID information received by the management server 242 matches an identification authenticated by the USB management server 242, the received USB ID information is determined as valid. Otherwise, if the received USB ID information does not match any identification in the list, the received USB ID information is determined as invalid. Supposing the list comprises an authenticated UDHC, and the USB ID information 212 related to the USB device 114 and the host device 110 matches the authenticated UDHC. Then the USB ID information 212 is determined as valid and the USB device 114 and the host device 110 are allowed to build a USB connection.

With these embodiments, the USB devices and host devices may be managed in a centralized manner at the management server 242 by defining an authenticated list. By using the authenticated list, all the USB devices and host devices that match the authenticated list may be allowed to create USB connections without a need to configure the USB devices and host devices one by one.

In some embodiments, a database may be provided at the USB management server 242 for storing a validity of the USB ID information, and the USB management server 242 may instruct the stored validity to the USB management client 210 for managing the connection. For example, if the USB ID information 212 is valid, it may be stored in a whitelist in the database; otherwise it may be stored in a blacklist in the database. With these embodiments, the management server 242 may manage the connections based on the database in an effective manner.

In some embodiments, the authentication policy 244 may comprise the open policy 520. Here, if a USB device is plugged into a host device when the open policy 520 is enable, USB ID information is determined as valid. If a USB device is not plugged into a host device when the open policy 520 is enable, USB ID information is determined as invalid. In other words, this policy permits only plugin operations that occurs after the open policy 520 is enabled and before it is disabled. In these embodiments, the USB ID information 212 may comprise any of the UDHC, THC, UC and UIHC. Once the USB device 114 is plugged in when the open policy 520 is enabled, the USB ID information 212 is determined as valid and stored into the database for further management. After the open policy 520 is disabled, the USB device 114 may still access to the host device 110 since the USB ID information 212 is already stored in the database. After being plugged in, the authenticated USB device may maintain the USB connection until it is pulled out from the corresponding host device. With these embodiments, the management server 242 may authenticate a great number of USB devices and host device by simply enabling the open policy 520.

In some embodiments, the open policy 520 may be used for authenticating multiple USB devices and multiple host devices at one time. For example, the open policy 520 may be enabled for the multiple host devices. At this point, all USB devices that are plugged into any of the multiple host devices may be authenticated. After the successful authentications, the open policy 520 may be manually disabled. With these embodiments, a great number of USB devices and host devices may be authenticated without a need for adding respective USB ID information manually.

In some embodiments, the authentication policy 244 may comprise the unique host policy 530. Here, a list of authenticated host devices may be predefined at the management server 242. For example, a MAC address, a serial number or another host-specific identification may be used for representing the authenticated host device. Specifically, if the USB ID information 212 is received from a host device authenticated by the USB management server 242, the USB ID information 212 is determined as valid. Otherwise, if the USB ID information 212 is not received from any host device authenticated by the USB management server 242, the USB ID information 212 is determined as invalid. The unique host policy 530 may not accept the auto transmitting mode.

For example, a host device owned by the IT engineer may be added into the above list. At this point, any USB device may be plugged into the host device and a USB connection may be established. With these embodiments, some host devices with higher priorities may be authenticated and all the USB devices may be allowed to connect with the authenticated host devices.

In some embodiments, a list of authenticated USB devices may be predefined at the management server 242. At this point, if the USB ID information 212 indicates that a USB device authenticated by the USB management server 242 is plugged into a host device, the USB ID information 212 is determined as valid. Otherwise, if the USB ID information 212 indicates that a USB device not authenticated by the USB management server 242 is plugged into a host device, the USB 1D information 212 is determined as in invalid. For example, a USB storage of the IT engineer may be added into the list, such that the USB storage may be accepted by any host device in the company.

In some embodiments, the authentication policy 244 may comprise the time window policy 540. Here, a list of authenticated time windows may be predefined at the management server 242, and USB connections may be permitted within the predefined time window. If the current time is included in a time window authenticated by the USB management server 242, the USB ID information 212 is determined as valid by the management server 242. Otherwise, if the current time is not included in any time window authenticated by the USB management server 242, the USB ID information 212 is determined as invalid. If the list comprises a time period of "09:00-17:00" of working days, then any USB device that is plugged into any host device during 09:00-17:00 of a working day may be authenticated.

In some embodiments, once the current time point is excluded from the predefined time window, the USB connections are disabled. The time window policy 540 may accept both of the manual and auto transmitting modes. With these embodiments, the management server 242 may provide customized policies to different USB devices and host devices.

In some embodiments, the USB ID information 212 may be determined as valid without considering the value of the USB ID information 212. At this point, no matter which type of USB ID information 212 is adopted and no matter what is the value of the USB ID information 212, the USB ID information 212 is always valid as long as the current time point is within the authenticated time window. In some embodiments, the USB ID information 212 may be determined as valid by further considering the value of the USB ID information 212.

In some embodiments, the authentication policy 244 may comprise the location policy 550. The management server 242 may determine a location of the host device 110 based on a topology of host devices that are managed by the USB management server 242. Optionally, the management server 242 may generate location options and offers them to management client 210 for the user of the management client 210 to configure the USB connection. The location policy 550 may not accept the auto transmitting mode.

Specifically, if the location is authenticated by the USB management server 242, the USB 1D information 212 is determined as valid. Otherwise, if the location is not authenticated by the USB management server 242, the USB ID information 212 is determined as invalid. With these embodiments, host devices at specific locations may be permitted to accept USB device plugin by defining a range of locations. For example, it may be defined that all the host devices that belong to a certain topology location are authenticated. Therefore, manual workloads for configuring each of the USB devices and the host devices may be greatly reduced.

In some embodiments, the authentication policy 244 may comprise a combination policy 560 that is implemented based on at least two of the simple policy 510, the open policy 520, the unique host policy 530, the time window policy 540 and the location policy 550. Here, the above policies may be combined to enhance the security level of USB connection management. For example, the above policies may be assigned with respective priorities. When the combined policies are inconsistent with each other, a policy with a higher priority works. The combination policy 560 may accept both of the manual and auto transmitting modes. With these embodiments, the management server 242 may provide a solution for defining a desired authentication policy.

In some embodiments, the management server 242 may be deployed in the individual authentication device 240. The authentication device 240 may work as an authenticating center for serving multiple companies. Here, the authentication device 240 may be connected with the cloud 250 for communicating with the management clients 210, 220, . . . , and 230. Alternatively and/or in addition to, the management server 242 may be built for the company and deployed in a local manner. For example, the management server 242 may be deployed in any of the host devices 110, 120, . . . , and 130, and thus the management server 242 may communicate with the management clients in a local manner or via an intranet of the company.

Having described how to determine the validity of the USB ID information, reference will be made back to FIG. 3 for further operations of the USB connection management. In FIG. 3, the authentication device 240 returns 318 the determined validity to the host device 110. The validity may be returned directly, alternative, the validity may be encrypted first. Next, the host device 110 permits/forbids 320 the USB connection based on the received validity. If the validity from the authentication device 240 indicates that the USB ID information 212 is valid based on the authentication policy 244, the management client 210 may permit the host device 110 to establish a connection with the USB device 114. With the established connection, the host device 110 may read data from the USB device 114 (such as a USB storage disk) to the host device 110 and/or write data from the host device 110 to the USB device 114. If the validity indicates that the USB ID information 212 is invalid, the management client 210 may forbid the connection. At this point, although the USB device 114 is plugged into the host device 110, it cannot communicate with the host device 110.

Figure 6:
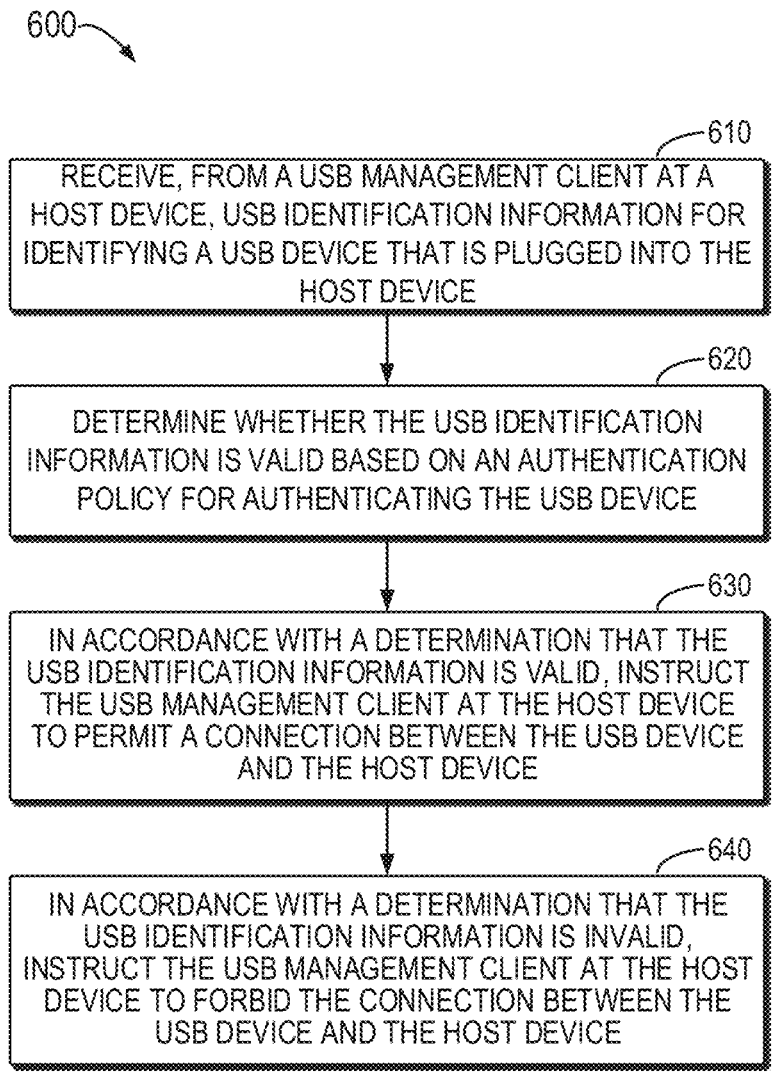
FIG. 6 illustrates a flowchart of an example method for managing a USB connection at a USB management server according to embodiments of the present disclosure.

Having described interactions between the USB device 114, the host device 110 and the authentication device 240, hereinafter, reference will be made to FIG. 6 for steps implemented at the management server side. FIG. 6 illustrates a flowchart of an example method 600 for managing a USB connection at a USB management server according to embodiments of the present disclosure. It is to be understood that the method 600 may be executed by any of the authentication device 240 and the host devices 110, 120, . . . , and 130, as described with reference to FIGS. 2-5.

As illustrated in FIG. 6, at block 610, the USB ID information 212 is received from the USB management client 210 at the host device 110, here the USB ID information 212 is for identifying the USB device 114 that is plugged into the host device 110.

In some embodiments, the USB ID information 212 may comprises any of: the USB descriptor hash code 410, the time hash code 420, the USB certification 430, and the USB identifier hash code 440. The USB descriptor hash code 410 may be generated by the USB management client 212 based on an identification of the USB device 114 and an identification of the host device 110. The time hash code 420 may be generated by the USB management client 210 based on an identification of the host device 110 and a time point at which the USB device 114 is plugged into the host device 110. The USB certification 430 may be read from the USB device 114 by the USB management client 210. The USB identifier hash code 440 may be generated by the USB device 110.

At block 620, whether the USB ID information 212 is valid is determined based on the authentication policy 244 for authenticating the USB device 114. In some embodiments, the authentication policy 244 may comprise any of: the simple policy 510, the open policy 520, the unique host policy 530, the time window policy 540, the location policy 550, and the combination policy 560.

In some embodiments, the simple policy 510 may be adopted for determining the validity. If the USB ID information 212 matches an identification authenticated by the USB management server 242, the USB ID information 212 is determined as valid. If the USB ID information 212 does not match any identification authenticated by the USB management server 242, the USB ID information 212 is determined as invalid.

In some embodiments, the open policy 520 may be adopted for determining the validity. If the USB ID information indicates that the USB device 114 is plugged into the host device 110 when the open policy 520 is enabled, the USB ID information 212 is determined as valid. If the USB ID information indicates that the USB device 114 is not plugged into the host device 110 when the open policy 520 is enabled, the USB ID information 212 is determined as invalid.

In some embodiments, the unique host policy 530 may be adopted for determining the validity. If the USB ID information 212 is received from a host device authenticated by the USB management server 242, the USB ID information is determined as valid. If the USB ID information 212 is not received from any host device authenticated by the USB management server 242, the USB ID information is determined as invalid.

In some embodiments, the time window 540 may be adopted for determining the validity. If a current time point is included in a time window authenticated by the USB management server 242, the USB ID information 212 is determined as valid. If a current time point is not included in any time window authenticated by the USB management server 242, the USB ID information 212 is determined as invalid.

In some embodiments, the location policy 550 may be adopted for determining the validity. A location of the host device 110 may be determined based on a topology of host devices that are managed by the USB management server 242. If the location is authenticated by the USB management server 242, the USB ID information 212 is determined as valid. If the location is not authenticated by the USB management server 242, the USB ID information 212 is determined as invalid. In some embodiments, the combination policy 560 may be adopted for determining the validity.

At this point, the above policies 510-550 may be combined for providing an enhanced policy.

At block 630, in accordance with a determination that the USB ID information 212 is valid, the USB management client 210 at the host device 110 is instructed to permit a connection between the USB device 114 and the host device 110. Therefore, the host device 110 may access the USB device 114. At block 640, in accordance with a determination that the USB ID information 212 is invalid, the USB management client 210 at the host device 110 is instructed to forbid the connection between the USB device 114 and the host device 110. At this point, although the USB device 114 is plugged into the host device 110, the host device 110 cannot communicate with the USB device 114.

In some embodiments, the validity of the USB ID information 212 may be stored in a database of the USB management server 242. Based on the stored validity, the USB management client 210 may be instructed to manage the connection correspondingly. In some embodiments, the USB manager server 242 may be deployed in the authentication device 240 that is connected with the host device 110 via a cloud. In some embodiments, the USB manager server 114 may be deployed in any of the host devices 110, 120, . . . , and 130.

With these embodiments, the method 600 provides a centralized managing solution for controlling multiple USB devices and host devices via the management server 242 and the respective management clients 210, 220, . . . , and 230. Since the IT engineer may setup all the configurations via the management server 242 in a centralized way, manual workloads for configuring each of the USB devices and host devices are greatly reduced. Further, the authentication policy 244 may provide more flexible management and different host devices may be managed with individual authentication policy.

Figure 7:
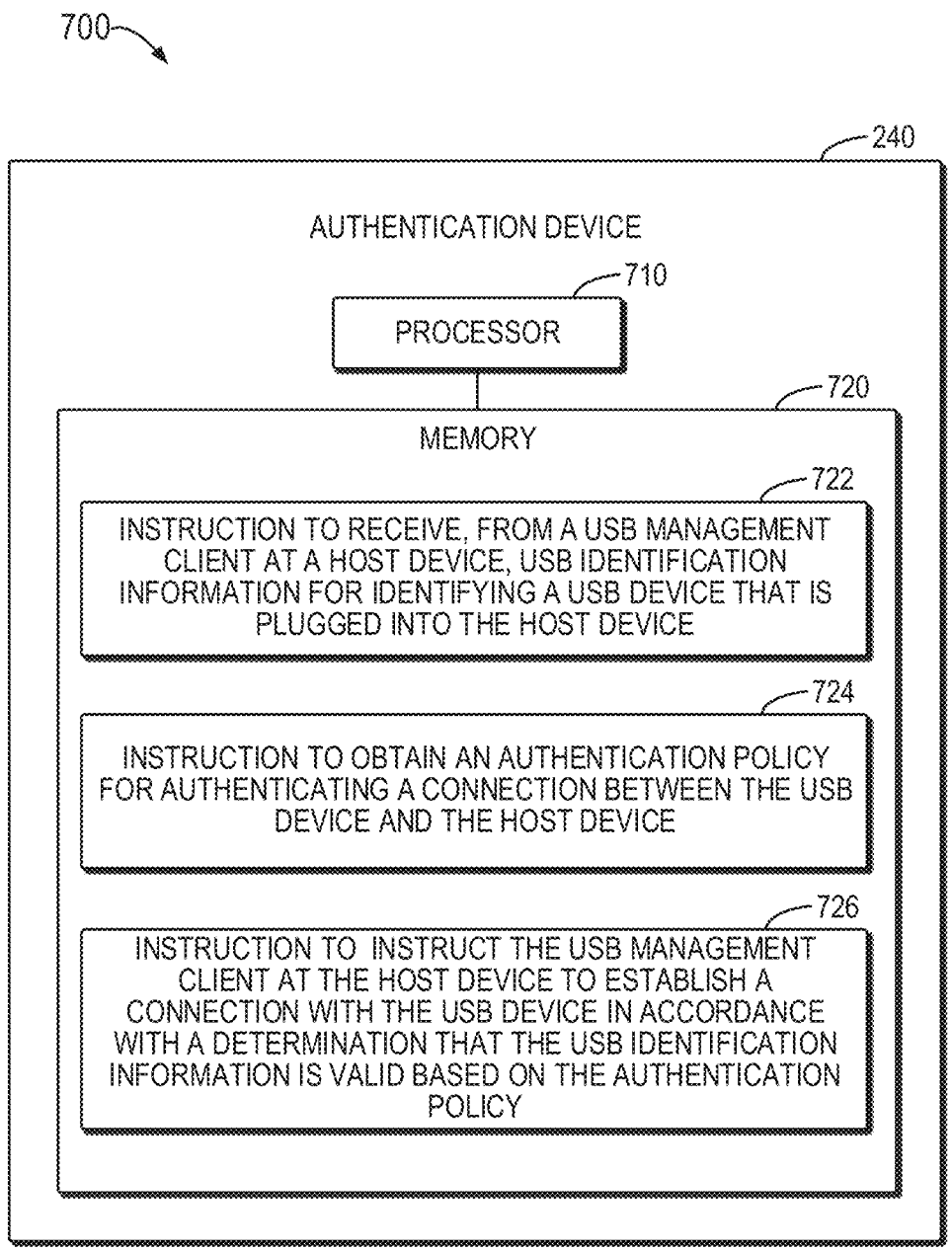
FIG. 7 illustrates a block diagram of an example authentication device according to embodiments of the present disclosure.

FIG. 7 illustrates a block diagram 700 of an example authentication device according to embodiments of the present disclosure. The authentication device 240 comprises a processor 710 and a memory 720 coupled to the processor 710. The memory 720 stores instructions 722, 724, and 726 to cause the processor 710 to implement a USB management server.

As illustrated in FIG. 7, the memory 720 stores the instruction 722 to receive, from a USB management client at a host device, USB ID information for identifying a USB device that is plugged into the host device. In some embodiments, the USB ID information may comprises any of: the USB descriptor hash code 410, the time hash code 420, the USB certification 430, and the USB identifier hash code 440. The memory 720 further stores the instruction 724 to obtain an authentication policy for authenticating a connection between the USB device and the host device. In some embodiments, the authentication policy 244 may comprise any of: the simple policy 510, the open policy 520, the unique host policy 530, the time window policy 540, the location policy 550, and the combination policy 560. The memory 720 further stores the instruction 726 to instruct the USB management client at the host device to establish a connection with the USB device in accordance with a determination that the USB ID information is valid based on the authentication policy. In some embodiments, the memory 720 stores other instructions to perform other acts that are implemented by the above USB management server, and details are omitted hereinafter.

With these embodiments, the authentication device 240 provides a centralized managing solution for controlling multiple USB devices and host devices. The authentication device 240 may be implemented by an individual device or by the host device. Therefore, USB connections between the USB devices and the host devices may be managed in a remote way or in a local way.

Figure 8:
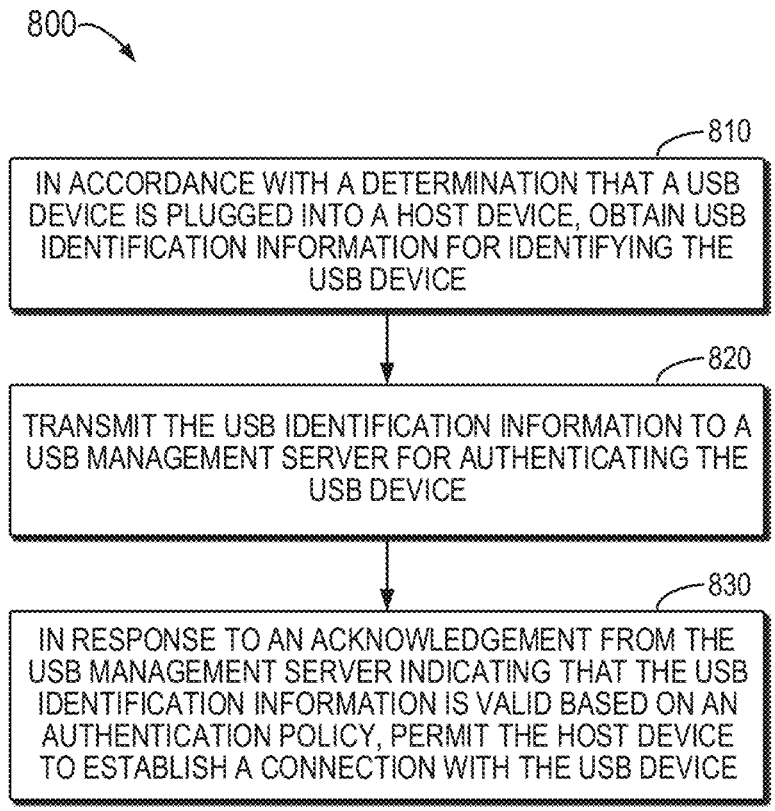
FIG. 8 illustrates a flowchart of an example method for managing a USB connection at a USB management client according to embodiments of the present disclosure.

Hereinafter, reference will be made to FIG. 8 for steps implemented at the management client side. FIG. 8 illustrates a flowchart of an example method 800 for managing a USB connection at a USB management client according to embodiments of the present disclosure. In some embodiments, the method 800 may be implemented at the USB management clients 212, 222, . . . , and 232 at the host devices 110, 120, . . . , and 130, respectively. At block 810, in accordance with a determination that a USB device is plugged into a host device, USB ID information for identifying the USB device is obtained. In some embodiments, the USB ID information may comprises any of: the USB descriptor hash code 410, the time hash code 420, the USB certification 430, and the USB identifier hash code 440.

The USB descriptor hash code 410 may be generated by the USB management client 212 based on an identification of the USB device and an identification of the host device. The time hash code 420 may be generated by the USB management client based on an identification of the host device and a time point at which the USB device is plugged into the host device. The USB certification 430 may be read from the USB device by the USB management client. The USB identifier hash code 440 may be generated by the USB device. In some embodiments, the USB 1D information may be generated in response to a request from a user of the management client. In some embodiments, the USB ID information may be generated in response to a determination that the USB device having been plugged into the host device.

At block 820, the USB ID information is transmitted to a USB management server 242 for authenticating the USB device. At block 830, in response to an acknowledgement from the USB management server 242 indicating that the USB ID information is valid based on an authentication policy 244, the host device is permitted to establish a connection with the USB device. In some embodiments, the authentication policy 244 may comprise any of: the simple policy 510, the open policy 520, the unique host policy 530, the time window policy 540, the location policy 550, and the combination policy 560.

In some embodiments, with the simple policy 510, the USB ID information is determined as valid if the USB ID information matches an identification authenticated by the USB management server. In some embodiments, with the open policy 520, the USB ID information is determined as valid if the USB ID information indicates that the USB device is plugged in the host device when the open policy is enabled. In some embodiments, with the unique host policy 530, the USB ID information is determined as valid if the USB ID information is received from a host device authenticated by the USB management server. In some embodiments, with the time window policy 540, the USB ID information is determined as valid if a current time point is included in a time window authenticated by the USB management server. In some embodiments, with the location policy 560, the USB ID information is determined as valid if a location of the host device is authenticated by the USB management server. In some embodiments, with the combination policy 560, the USB ID information is determined as valid based on at least two of the above policies.

In some embodiments, in response to the acknowledgement from the USB management server 242 indicates that the USB ID information is invalid based on the authentication policy 244, the host device is forbidden to establish a connection with the USB device.

With these embodiments, the method 800 provides a client method and facilitates the method 600 for managing USB connections between the USB devices and host devices in a centralized way. Therefore, the IT engineer may control the USB devices and host devices via respective management clients without a need to individually configure each of the USB devices and the host devices.

Figure 9:
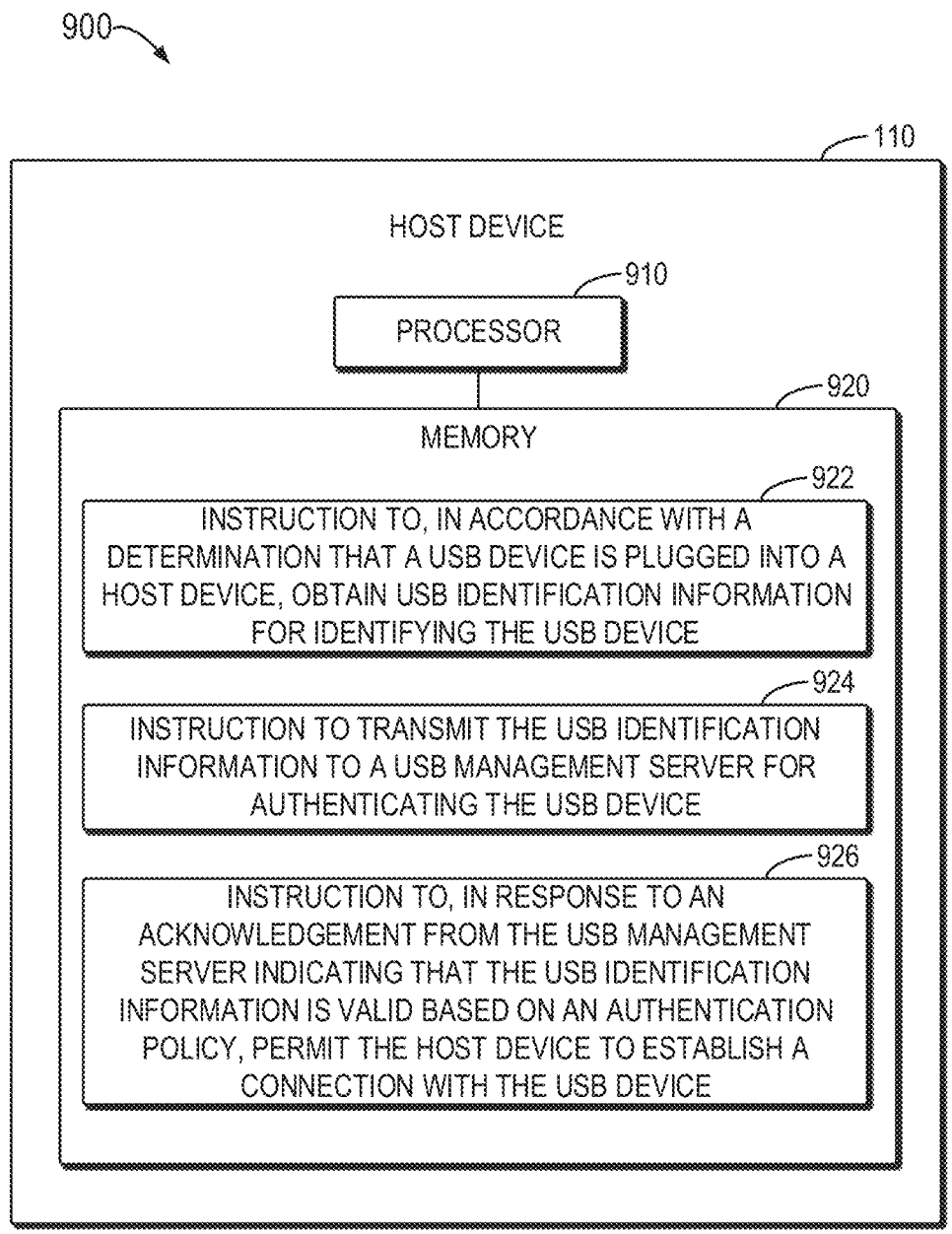
FIG. 9 illustrates a block diagram of an example host device according to embodiments of the present disclosure.

FIG. 9 illustrates a block diagram 900 of an example host device according to embodiments of the present disclosure. The host device 110 comprises a processor 910 and a memory 920 coupled to the processor 910. The memory 920 stores instructions 922, 924, and 926 to cause the processor 910 to implement a USB management client.

As illustrated in FIG. 9, the memory 920 stores the instruction 922 to, in accordance with a determination that a USB device is plugged into a host device, obtain USB ID information for identifying the USB device. In some embodiments, the USB ID information may comprises any of: the USB descriptor hash code 410, the time hash code 420, the USB certification 430, and the USB identifier hash code 440. The memory 920 further stores the instruction 924 to transmit the USB ID information to a USB management server for authenticating the USB device. The memory 920 further stores the instruction 926 to, in response to an acknowledgement from the USB management server indicating that the USB ID information is valid based on an authentication policy, permit the host device to establish a connection with the USB device. In some embodiments, the authentication policy 244 may comprise any of: the simple policy 510, the open policy 520, the unique host policy 530, the time window policy 540, the location policy 550, and the combination policy 560. In some embodiments, the memory 920 further stores other instructions to perform other acts that are implemented by the above USB management client, and details are omitted hereinafter. With these embodiments, the host device may act as an intermediary for authenticating the USB connection based on instructions from the authentication device 240.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
   receiving, from a USB management client at a host device, USB ID information for identifying a USB device that is plugged into the host device, wherein the USB ID information comprises a USB descriptor hash code that is generated by the USB management client based on an identification of the USB device and an identification of the host device;
   determining whether the USB ID information is valid based on a unique host policy, wherein the unique host policy determines whether the USB ID information is valid based on a unique identity of the host device;
   in accordance with a determination that the USB ID information is valid, instructing the USB management client at the host device to permit a connection between the USB device and the host device; and
   in accordance with a determination that the USB ID information is invalid, instructing the USB management client at the host device to forbid the connection between the USB device and the host device,
   wherein the method is implemented at a USB management server.

2. The method according to claim 1, wherein the USB ID information further comprises any of:
   a time hash code that is generated by the USB management client based on the identification of the host device and a time point at which the USB device is plugged into the host device;
   a USB certification that is read from the USB device by the USB management client; and
   a USB identifier hash code that is generated by the USB device.

3. The method according to claim 1, wherein the unique host policy comprises:
   in response to a determination that the USB ID information is received from a host device authenticated by the USB management server, determining the USB ID information as valid; and
   in response to a determination that the USB ID information is not received from any host device authenticated by the USB management server, determining the USB ID information as invalid.

4. The method according to claim 1, further comprising:
   storing a validity of the USB ID information in a database of the USB management server; and
   instructing, based on the stored validity, the USB management client to manage the connection.

5. The method according to claim 1, wherein the USB manager server is deployed in any of:
   an authentication device that is connected with the host device; and
   the host device.

6. The method according to claim 1, wherein the determining whether the USB ID information is valid further comprises:
   determining whether the USB ID information is valid based on an authentication policy, a time window policy and a host location policy, wherein each of the unique host, authentication, time window, and host location policies is assigned a priority;
   combining each of the unique host, authentication, time window, and host location policies, and upon determining that the combination of the unique host, authentication, time window, and host location policies results in a validation inconsistency, validating the USB ID information based on the determination that any one of the unique host, authentication, time window, and host location policies having the highest priority among the unique host, authentication, time window, and host location policies is valid.

7. The method according to claim 6, wherein determining whether the USB ID information is valid based on the authentication policy comprises:
   in response to a determination that the USB ID information matches an identification authenticated by the USB management server, determining the USB ID information as valid; and
   in response to a determination that the USB ID information does not match any identification authenticated by the USB management server, determining the USB ID information as invalid.

8. The method according to claim 6, wherein determining whether the USB ID information is valid based on the time window policy comprises:
   in response to a determination that a current time point is included in a time window authenticated by the USB management server, determining the USB ID information as valid; and
   in response to a determination that a current time point is not included in any time window authenticated by the USB management server, determining the USB ID information as valid.

9. The method according to claim 6, wherein determining whether the USB ID information is valid based on the host location policy comprises:
   determining a location of the host device based on a topology of host devices that are managed by the USB management server;
   in response to a determination that the location is authenticated by the USB management server, determining the USB ID information as valid; and
   in response to a determination that the location is not authenticated by the USB management server, determining the USB ID information as valid.

10. A method, comprising:
- in accordance with a determination that a USB device is plugged into a host device, obtaining USB ID information for identifying the USB device, wherein the USB ID information comprises a time hash code that is generated based on an identification of the host device and a time point at which the USB device is plugged into the host device;
- transmitting the USB ID information to a USB management server for authenticating the USB device; and
- in response to an acknowledgement from the USB management server indicating that the USB ID information is valid based on a time window policy, permitting the host device to establish a connection with the USB device, wherein the time window policy determines whether the USB ID information is valid based on the time the USB device is plugged into the host device;
- wherein the method is implemented at a USB management client at the host device.

11. The method according to claim 10, further comprising:
- in response to the acknowledgement from the USB management server indicating that the USB ID information is invalid based on the time window policy, forbidding the host device to establish a connection with the USB device.

12. The method according to claim 10, wherein the USB ID information further comprises any of:
- a USB descriptor hash code that is generated based on an identification of the USB device and the identification of the host device;
- a USB certification that is read from the USB device; and
- a USB identifier hash code that is generated by the USB device.

13. The method according to claim 10, wherein generating the USB ID information comprises any of:
- generating the USB ID information in response to a request from a user of the management client; and
- generating the USB ID information in response to a determination that the USB device having been plugged into the host device.

14. The method according to claim 10, wherein the time window policy comprises:
- in response to a determination that a current time point is included in a time window authenticated by the USB management server, determining the USB ID information as valid; and
- in response to a determination that a current time point is not included in any time window authenticated by the USB management server, determining the USB ID information as valid.

\* \* \* \* \*